(12) United States Patent
Yao

(10) Patent No.: US 11,157,897 B2
(45) Date of Patent: Oct. 26, 2021

(54) METHODS AND DEVICES FOR MANAGING ACCESS TO ACCOUNT IN BLOCKCHAIN SYSTEM

(71) Applicant: Advanced New Technologies Co., Ltd., Grand Cayman (KY)

(72) Inventor: Zhongxiao Yao, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/773,235

(22) Filed: Jan. 27, 2020

(65) Prior Publication Data

US 2020/0349556 A1  Nov. 5, 2020

Related U.S. Application Data

(63) Continuation of application No. PCT/CN2019/085227, filed on Apr. 30, 2019.

(51) Int. Cl.
 *G06Q 20/00* (2012.01)
 *G06Q 20/36* (2012.01)
 (Continued)

(52) U.S. Cl.
 CPC ......... *G06Q 20/3674* (2013.01); *G06Q 40/02* (2013.01); *H04L 9/0637* (2013.01)

(58) Field of Classification Search
 CPC .......... G06Q 2220/00; G06Q 2220/10; G06Q 2220/16; G06Q 20/3674; G06Q 40/02;
 (Continued)

(56) References Cited

U.S. PATENT DOCUMENTS

| 8,955,099 | B1* | 2/2015 | Varanasi | G06F 21/105 |
| | | | | 726/15 |
| 10,587,644 | B1* | 3/2020 | Stolte | H04L 63/1433 |

(Continued)

FOREIGN PATENT DOCUMENTS

| CN | 106796688 A | 5/2017 |
| CN | 108012582 A | 5/2018 |

(Continued)

OTHER PUBLICATIONS

Written Opinion of the International Searching Authority of PCT Application No. PCT/CN2019/085227, dated Jan. 6, 2020, issued by the ISA/CN—National Intellectual Property Administration, PRC, China.

(Continued)

*Primary Examiner* — Dante Ravetti
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media for managing access to an account in a blockchain system. One of the methods includes: receiving, from a first account of the blockchain system, a request for accessing a second account of the blockchain system; determining an account level of the first account based on the request; determining an account level of the second account; determining whether the account level of the first account satisfies an account condition based on the account level of the second account; and permitting the request for accessing the second account based on a determination that the account level of the first account satisfies the account condition.

13 Claims, 9 Drawing Sheets

(51) Int. Cl.
*G06Q 40/02* (2012.01)
*H04L 9/06* (2006.01)

(58) Field of Classification Search
CPC . G06Q 20/223; H04L 9/0637; H04L 2209/38; H04L 2209/56; H04L 9/3239
See application file for complete search history.

(56) References Cited

U.S. PATENT DOCUMENTS

| | | | |
|---|---|---|---|
| 2001/0011253 A1* | 8/2001 | Coley | G06F 21/10 705/59 |
| 2001/0013024 A1* | 8/2001 | Takahashi | G06F 21/105 705/59 |
| 2005/0138074 A1* | 6/2005 | O'Connor | G06Q 10/06 |
| 2012/0278175 A1* | 11/2012 | Agarwal | G06Q 30/02 705/14.64 |
| 2013/0262265 A1* | 10/2013 | Song | G06F 21/105 705/26.41 |
| 2015/0106500 A1* | 4/2015 | Fakhouri | H04L 67/34 709/224 |
| 2017/0109506 A1* | 4/2017 | Shetty | G06F 16/13 |
| 2018/0196955 A1* | 7/2018 | Dageville | G06F 16/256 |
| 2019/0036932 A1 | 1/2019 | Bathen et al. | |
| 2019/0109707 A1 | 4/2019 | Ajoy | |
| 2019/0281066 A1* | 9/2019 | Simons | H04L 63/105 |
| 2020/0042672 A1* | 2/2020 | Banerjee | G06F 21/105 |
| 2020/0204876 A1* | 6/2020 | Thompson | H04N 21/2541 |

FOREIGN PATENT DOCUMENTS

| | | |
|---|---|---|
| CN | 108632268 A | 10/2018 |
| CN | 108846755 A | 11/2018 |
| CN | 107733855 B | 11/2019 |
| WO | WO 2018/223042 A1 | 12/2018 |
| WO | WO 2019/072293 A2 | 4/2019 |

OTHER PUBLICATIONS

International Search Report of PCT Application No. PCT/CN2019/085227, dated Jan. 6, 2020, issued by the ISA/CN—National Intellectual Property Administration, PRC, China.
Extended Search Report for European Patent Application No. 19738259.1, dated Mar. 30, 2020.

* cited by examiner

METHODS AND DEVICES FOR MANAGING ACCESS TO ACCOUNT IN BLOCKCHAIN SYSTEM

CROSS REFERENCE TO RELATED APPLICATIONS

This application is a continuation of International Application No. PCT/CN2019/085227, filed Apr. 30, 2019, the entire content of which is incorporated herein by reference.

TECHNICAL FIELD

The specification relates generally to computer technologies, and more particularly, to methods and devices for managing access to an account in a blockchain system.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

The blockchain system may operate a plurality of user accounts, including regular accounts and contract accounts. Conventionally, a regular account may access a function of a smart contract by establishing a channel between the regular account and a contract account of the smart contract. The channel may provide free access to the function of the smart contract, which may be utilized by malicious parties.

To address the above problems, embodiments of the specification provide methods and devices for managing access to an account in a blockchain system.

SUMMARY

In one aspect, a computer-implemented method for managing access to an account in a blockchain system includes: receiving, from a first account of the blockchain system, a request for accessing a second account of the blockchain system; determining an account level of the first account based on the request; determining an account level of the second account; determining whether the account level of the first account satisfies an account condition based on the account level of the second account; and permitting the request for accessing the second account based on a determination that the account level of the first account satisfies the account condition.

In another aspect, a device for managing access to an account in a blockchain system includes: one or more processors; and one or more computer-readable memories coupled to the one or more processors and having instructions stored thereon. The instructions are executable by the one or more processors to: receive, from a first account of the blockchain system, a request for accessing a second account of the blockchain system; determine an account level of the first account based on the request; determining an account level of the second account; determine whether the account level of the first account satisfies an account condition based on the account level of the second account; and permit the request for accessing the second account based on a determination that the account level of the first account satisfies the account condition.

In yet another aspect, a non-transitory computer-readable medium has stored therein instructions that, when executed by a processor of a device, cause the device to perform a method for managing access to an account in a blockchain system. The method includes: receiving, from a first account of the blockchain system, a request for accessing a second account of the blockchain system; determining an account level of the first account based on the request; determining an account level of the second account; determining whether the account level of the first account satisfies an account condition based on the account level of the second account; and permitting the request for accessing the second account based on a determination that the account level of the first account satisfies the account condition.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
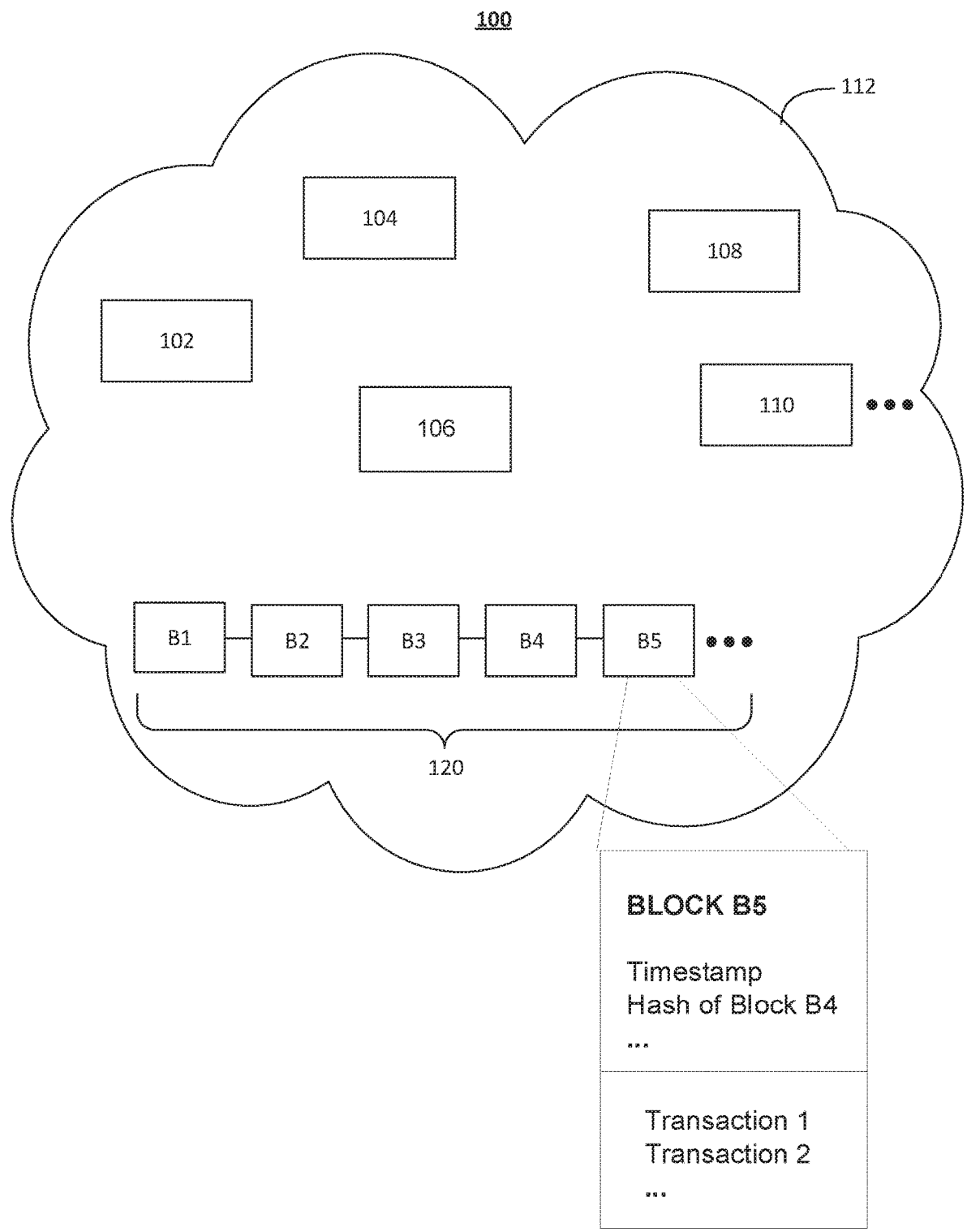
FIG. 1 illustrates a schematic diagram of a blockchain system, according to an embodiment.

Embodiments of the specification provide methods and devices for managing access to an account in a blockchain system. The methods and devices may receive, from a first account of the blockchain system, a request for accessing a second account of the blockchain system. The methods and devices may then determine an account level of the first account based on the request, determine an account level of the second account, and determine whether the account level of the first account satisfies an account condition based on the account level of the second account. The methods and devices may permit the request for accessing the second account based on a determination that the account level of the first account satisfies the account condition. In some embodiments, the second account corresponds to a smart contract.

Embodiments disclosed in the specification have one or more technical effects. In some embodiments, the account level of the first account and the account level of the second account may be determined based on a request for accessing the second account. This allows levels of the first account and the second account to be identified. In some embodiments, the methods and devices may provide an account fence to determine whether the first account satisfies an account condition based on the account level of the second account. This allows a level-basis access management for accessing the second account, such as a smart contract. In some embodiments, the methods and devices may further provide an interface fence to determine whether the first account level further satisfies an interface condition in order to permit accessing an interface of the smart contract. This allows a tailored access management for accessing one or more interfaces of the smart contract.

A blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
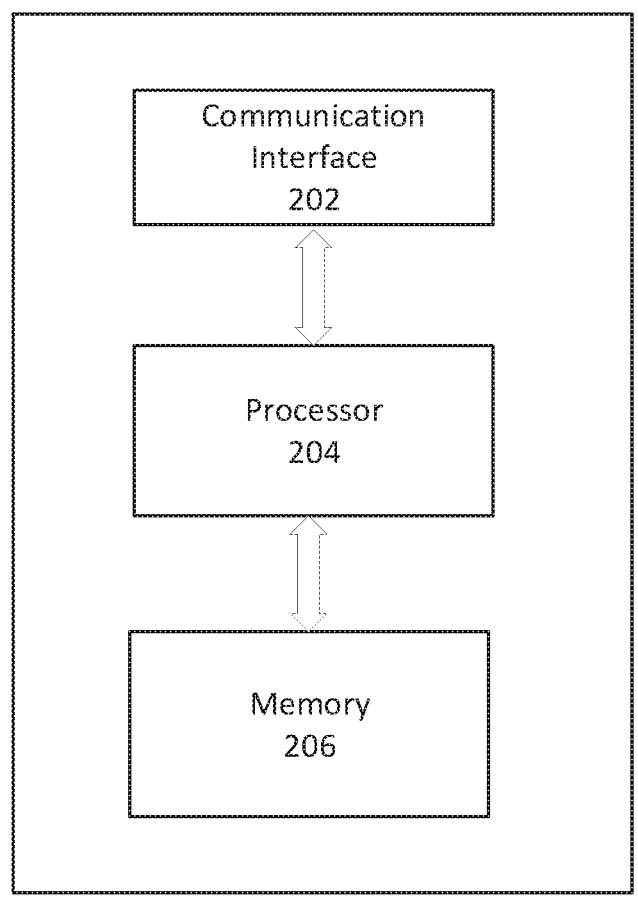
FIG. 2 illustrates a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may be configured to store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Referring back to FIG. 1, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that performs a specific task. The smart contract may be operational code that is fully or partially executed without human interaction.

As each of the nodes 102-110 may store a copy of the blockchain 120, each of the nodes 102-110 may also have access to a copy of the smart contract included in the blockchain 120. In an embodiment, a virtual machine may run on each of the nodes 102-110 and operate a copy of the smart contract. For example, the virtual machine may be an emulation of a computer system based on computer architectures, and provide functionality of a physical computer. The implementation of the virtual machine may involve specialized hardware, software, or a combination of hardware and software. In an embodiment, the smart contract may be assigned with an address on the blockchain 120, e.g., after the smart contract is compiled into operational code. The address of the smart contract is configured or used to locate the smart contract in the blockchain 120.

In an embodiment, a plurality of accounts may be created in the blockchain system 100. For example, a node (e.g., the node 102) of the blockchain system 100 may run a virtual machine to host the plurality of accounts. Also for example, the plurality of accounts may include one or more contract accounts and one or more regular accounts.

A contract account may correspond to a smart contract, and include operational code of the smart contract having at least one function. In some embodiments, the contract account may be used as a system-level account, which includes a system-level smart contract that is directed to, e.g., core functionalities of the blockchain system 100.

A regular account may be an account created by a user. For example, the regular account may be created based on a private key of the user, and may store user information regarding the user, such as transaction or balance information. The regular account generally does not correspond to a smart contract. However, the regular account may access a smart contract, e.g., a system-level smart contract, by calling a function or an interface related to a function of the smart contract.

Figure 3:
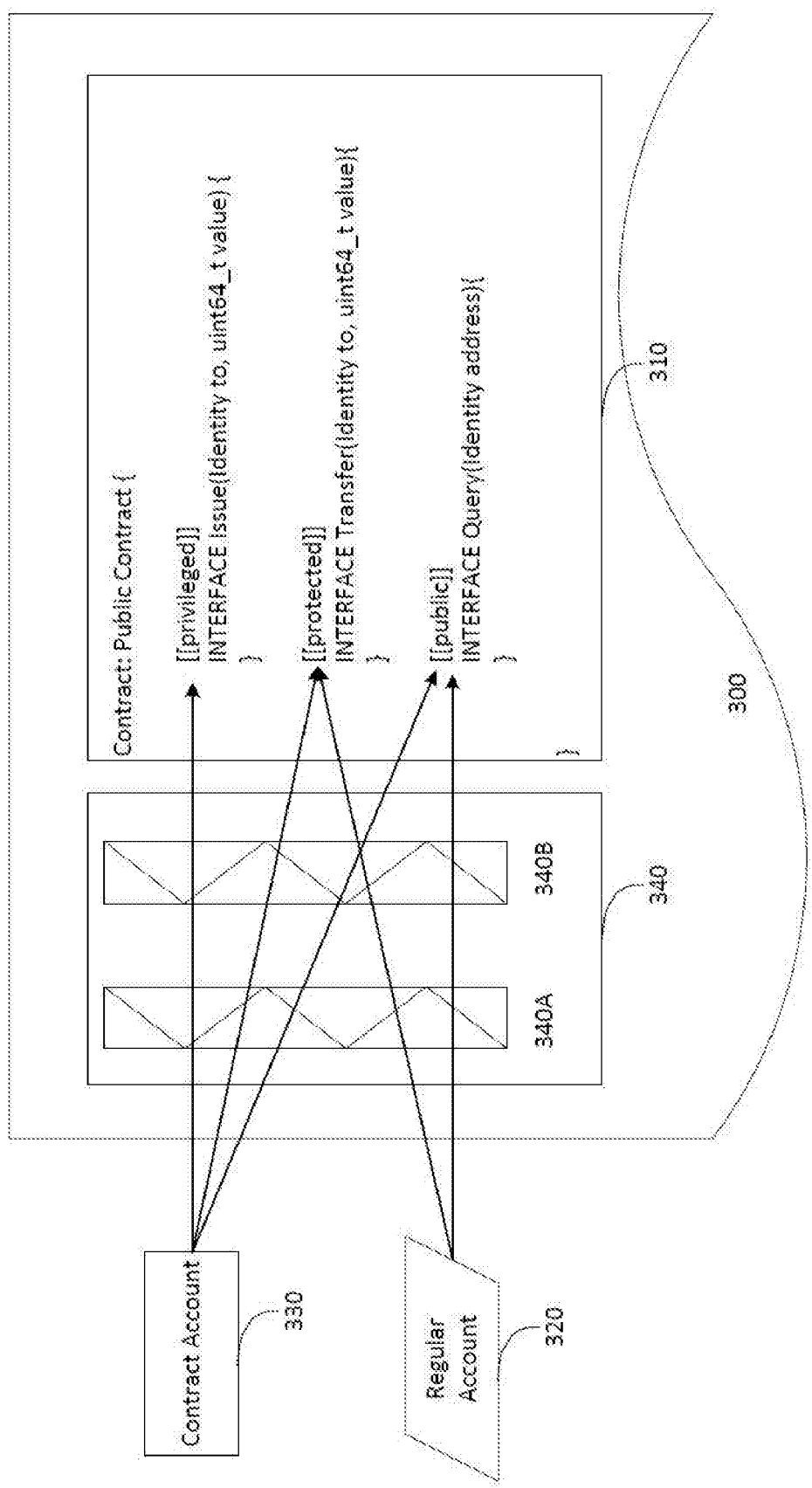
FIG. 3 illustrates a schematic diagram of a virtual machine of a blockchain system, according to an embodiment.

FIG. 3 illustrates a schematic diagram of a virtual machine 300 of a blockchain system, such as the blockchain system 100 (FIG. 1), according to an embodiment. For example, the virtual machine 300 may run on a node of the blockchain system, and operate an account corresponding to a smart contract 310. The smart contract 310 may be created by a user and accessible by a contract account associated with the user. Upon the creation of the account corresponding to the smart contract 310, an account level of the account, also referred herein to as an access level of the smart contract 310, may be defined based on an authorization of the user.

In an embodiment, the access level may be one of first, second, and third predetermined levels, such as a public level, a protected level, and a privileged level, respectively. For example, the public level may indicate that the smart contract 310 is publicly accessible and corresponds to a low-level limitation on access to the smart contract 310. Also for example, the protected level may indicate that the smart contract 310 is accessible only by accounts satisfying certain conditions and corresponds to a middle-level limitation on access to the smart contract 310. As another example, the privileged level may indicate that the smart contract 310 is accessible only by a designated account and corresponds to a high-level limitation on access to the smart contract 310.

In an embodiment, the authorization of the user may allow the user to define the access level of the smart contract 310 to be one or more of the above levels. For example, a user creating the blockchain system may have a highest authorization and can define a smart contract with any access level, e.g., the privileged level. In some embodiments, the blockchain system may verify the authorization of the user, and determine the access level of the smart contract 310 based on an access level requested by the user and the authorization of the user. For example, if the access level requested by the user, e.g., the privileged level, is above or beyond the authorization of the user, e.g., the public level or the protected level, the blockchain system may reject the request of the user and define the smart contract 310 to be a protected level. It is appreciated that, if the user does not request the access level of a smart contract, the smart contract may be assigned with a default access level, e.g., a public level. In an embodiment, the smart contract 310 may be assigned with a unique identity upon being created along with the associated contract account in the blockchain system.

In some embodiments, the smart contract 310 may include at least one interface. For example, as shown in FIG. 3, the smart contract 310 includes an interface "Issue," an interface "Transfer," and an interface "Query." Each interface may be related to a function of the smart contract 310, and the function may be called by accessing the interface. For example, the interface "Issue" may be used to call a function for issuing tokens, the interface "Transfer" may be used to call a function for transferring tokens from one account to another account, and the interface "Query" may be used to call a function for querying a balance of an account.

In an embodiment, an interface may be assigned with an interface level. The interface level may be determined by the user who creates the contract account, or determined by the blockchain system. For example, the blockchain system may determine whether an interface, e.g., the interface "Issue," is a system-level interface, and assign an interface level, e.g., the privileged level, to the interface in response to a determination that the interface is a system-level interface. It is appreciated that a default interface level may be assigned to an interface, if the interface level of the interface is not defined during creation. For example, the interface level may be "public" by default.

In the embodiment, similar to the access level of the smart contract 310, the interface level may be one of first, second, and third predetermined levels, such as a public level, a protected level, and a privileged level, respectively. For example, the public level may indicate that the interface is publicly accessible and corresponds to a low-level limitation on access to the interface. Also for example, the protected level may indicate that the interface is accessible only by accounts satisfying certain conditions and corresponds to a middle-level limitation on access to the interface. As another example, the privileged level may indicate that the interface is accessible only by a designated account and corresponds to a high-level limitation on access to the interface.

As described above, a plurality of accounts may be created in the blockchain system. In an embodiment, a regular account 320 may be created based on a private key of a user of the blockchain system. An account level of the regular account 320 may be determined by the blockchain system upon the creation. For example, the account level of the regular account 320 may be determined to be a protected level based on the private key of the user. The regular account 320 itself may include no smart contract, but may access the smart contract 310, e.g., through an interface of the smart contract 310. It is appreciated that the regular account 320 also has a unique identity in the blockchain system.

In addition to the regular account 320, a contract account 330 may be created based on another smart contract in the blockchain system. An account level of the contract account 330 may be determined by the blockchain system upon the creation. For example, the account level of the contract account 330 may be determined to be a privileged level based on another smart contract.

In the embodiment, similar to the access level of the smart contract 310 and the interface level, the account level may be one of first, second, and third predetermined levels, such as a public level, a protected level, and a privileged level, respectively. For example, the public level may indicate that the account has a low-level accessibility and can access only smart contracts and interfaces at the public level. Also for example, the protected level may indicate that the account satisfies certain conditions and can access only smart contracts and interfaces both at the protected or lower level(s). As another example, the privileged level may indicate that the account is a designated account that can access contracts and interfaces both at the privileged or lower level(s). Because the privileged level is the highest level in the embodiment, an account at the privileged level can generally access any smart contract or interface.

In an embodiment, the virtual machine 300 also operates a permission fence 340. The permission fence 340 is a software component that manages access to a smart contract, e.g., the smart contract 310, in the blockchain system. For example, the permission fence 340 may include an account fence 340A for managing an access to the smart contract 310 and an interface fence 340B for managing an access to an interface of the smart contract 310. It is appreciated that the permission fence 340 can also be implemented based on hardware, and may include more or less fences than the account fence 340A and the interface fence 340B.

When the virtual machine 300 of the blockchain system receives from an account a request for accessing the smart contract 310, the permission fence 340 may determine an account level of the account based on the request. The permission fence 340 may also determine an access level of the smart contract 310 and determine whether the request is permitted based on the account level and the access level. Details will be further described with reference to FIGS. 4A-4E.

Figure 4A:
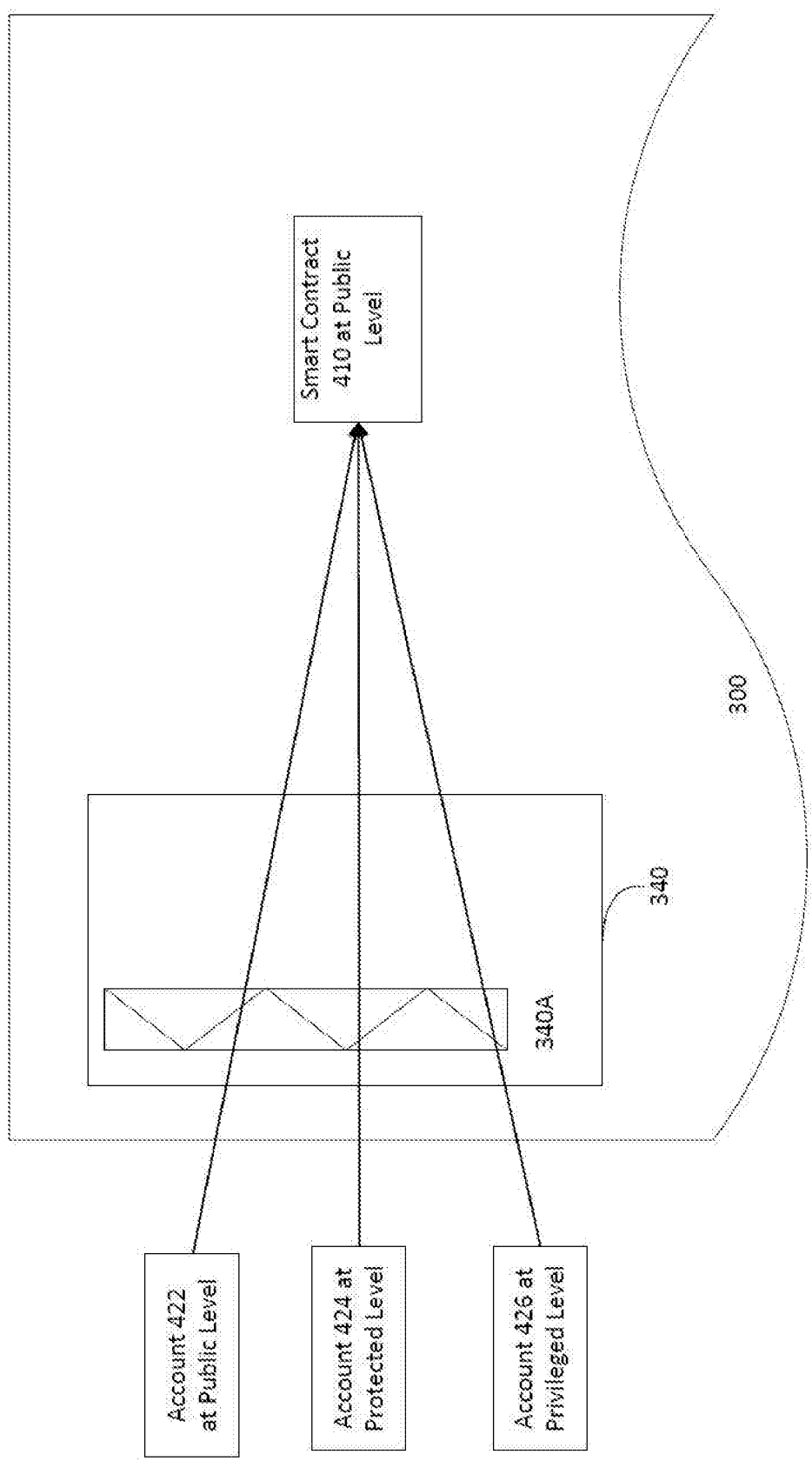
FIGS. 4A-4D illustrate schematic diagrams of methods for managing access to an account in a blockchain system, according to an embodiment.

FIG. 4A illustrates a schematic diagram of a method for managing access to an account, such as a contract account corresponding to a smart contract 410, according to an embodiment.

As shown in FIG. 4A, the virtual machine 300 (FIG. 3) hosts the smart contract 410 in a blockchain system, such as the blockchain system 100 (FIG. 1). In this embodiment, the virtual machine 300 operates the permission fence 340 that further includes the account fence 340A, and an account level of the contract account (also referred to herein as an access level of the smart contract 410) is the public level. The blockchain system also includes accounts 422, 424, and 426, and account levels of the accounts 422, 424, and 426 are assumed to be the public level, the protected level, and the privileged level, respectively. It is appreciated that the accounts 422, 424, and 426 may include regular or contract accounts.

In an embodiment, when the accounts 422, 424, and 426 send out requests for accessing the contract account (namely, the smart contract 410), the account fence 340A of the permission fence 340 may determine the account levels of the accounts based on the respective requests. As described above, each account may have a unique identity, and the account fence 340A may determine the account level of the account based on the unique identity. In some embodiments, the account fence 340A may determine the account level by using a look-up table. The look-up table may include a relationship between account levels and account identities. By searching for an account identity in the look-up table, the account fence 340A may determine the corresponding account level. In some embodiments, the request from an account may indicate the account level. For example, a header of the request may include information of the account level.

The account fence 340A may also determine the access level of the smart contract 410. In some embodiments, the account fence 340A may acquire the access level through the virtual machine 300.

Based on the account level of each account 422, 424, or 426, and the access level of the smart contract 410, the account fence 340A may determine whether the account level satisfies an account condition based on the access level of the smart contract 410. The account condition may include the account level being higher than or equal to the access level. For example, in FIG. 4A, for each account, the account fence 340A may determine whether the account level is higher than or equal to the access level. As the smart contract 410 has the public level in this embodiment, all of the account levels are higher than or equal to the access level. Thus, the account levels of the accounts 422, 424, and 426 all satisfy the account condition.

In response to a determination that the account levels of the accounts 422, 424, and 426 satisfy the account condition, the account fence 340A permits the requests for accessing the smart contract 410.

Figure 4B:
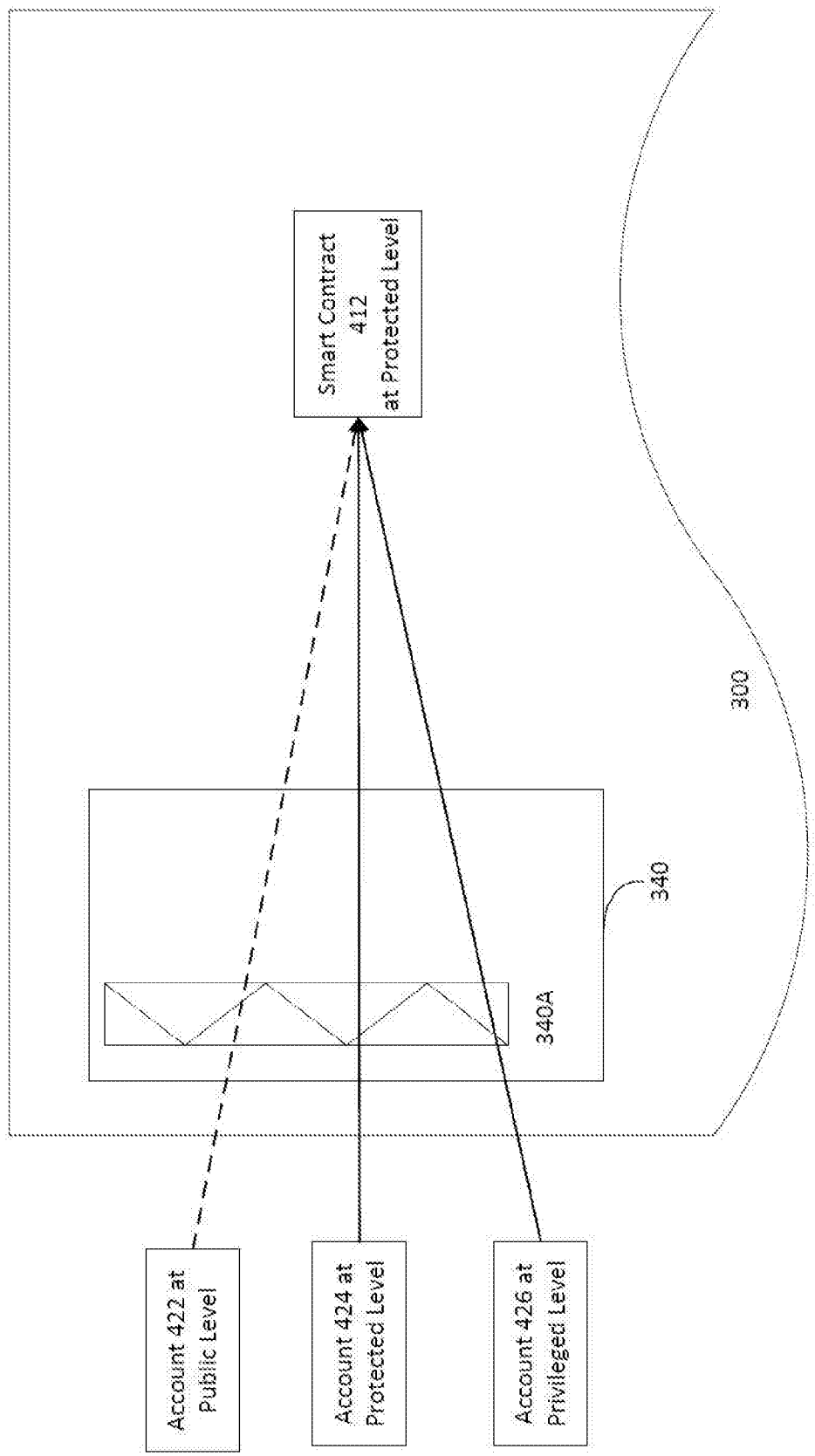

FIG. 4B illustrates a schematic diagram of a method for managing access to an account, such as a contract account corresponding to a smart contract 412, according to an embodiment. In this embodiment, similar to the embodiment illustrated in FIG. 4A, the accounts 422, 424, and 426 send out requests for accessing the contract account (namely, the smart contract 412), and the virtual machine 300 operates the permission fence 340 that further includes the account fence 340A. In addition, an account level of the contract account (also referred to herein as an access level of the smart contract 412) is the protected level. Because the account level (i.e., public) of the account 422 is lower than the protected level of the smart contract 412, and the account levels of the accounts 424 and 426 are higher than or equal to the protected level of the smart contract 412, the access request of the account 422 is denied (shown by a dashed line) by the account fence 340A and the access requests of the accounts 424 and 426 are permitted (shown by solid lines).

Figure 4C:
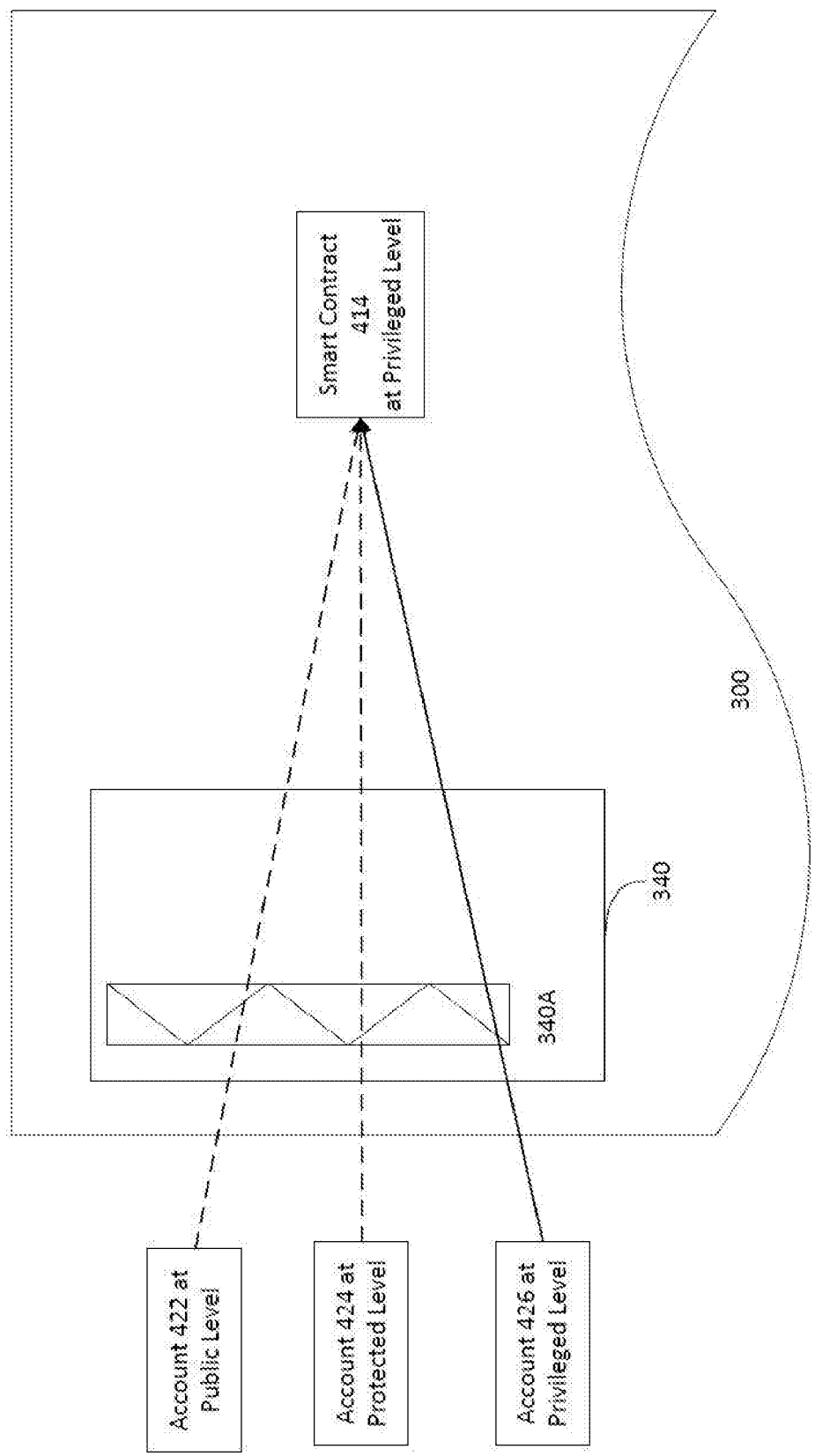

FIG. 4C illustrates a schematic diagram of a method for managing access to an account, such as a contract account corresponding to a smart contract 414, according to an embodiment. In this embodiment, similar to the embodiment illustrated in FIG. 4A, the accounts 422, 424, and 426 send out requests for accessing the contract account (namely, the smart contract 414), and the virtual machine 300 operates the permission fence 340 that further includes the account fence 340. In addition, an account level of the contract account (also referred to herein as an access level of the smart contract 414) is the privileged level. Because the account levels of the accounts 422 and 424 (i.e., public and protected) are lower than the privileged level of the smart contract 414, and the account level of the account 426 is equal to the privileged level of the smart contract 414, the access requests of the accounts 422 and 424 are denied (shown by dashed lines) by the account fence 340A and the access request of the account 426 is permitted (shown by a solid line).

Figure 4D:
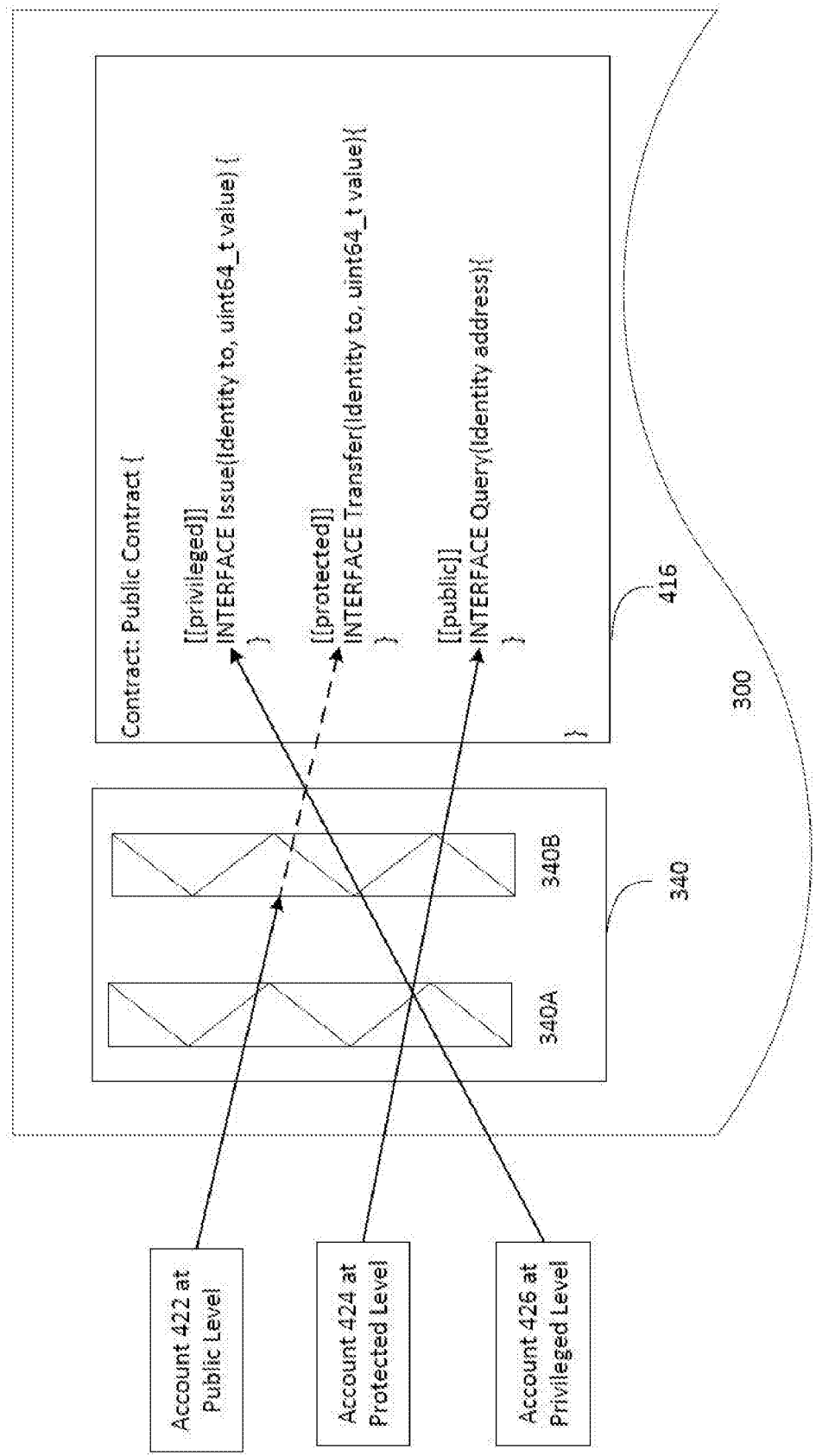

FIG. 4D illustrates a schematic diagram of a method for managing access to an account, such as a contract account corresponding to a smart contract 416, according to an embodiment. As shown in FIG. 4D, the accounts 422, 424, and 426 send out requests for accessing an interface "Transfer," and an interface "Query," and an interface "Issue" of the smart contract 416, respectively. In this embodiment, an interface level of the interface "Transfer" is the protected level, an interface level of the interface "Query" is a public level, and an interface level of the interface "Issue" is a privileged level. It is appreciated that these interfaces may be assigned different interface levels based on actual need.

The virtual machine 300 operates the permission fence 340 that further includes the account fence 340A and the interface fence 340B for managing access to the smart contract 416. Because an access level of the smart contract 416 is the public level in this embodiment, the account levels of the accounts 422, 424, and 426 are each higher than or equal to the access level of the smart contract 416, i.e., the accounts 422, 424, and 426 satisfy the account condition. Accordingly, the account fence 340A permits the requests of the accounts 422, 424, and 426 for accessing the smart contract 416. The interface fence 340B may further determine whether to permit each request for accessing a specific interface.

The interface fence 340B may determine the interface level of each interface. For example, the interface fence 340B may determine that the interface levels of the interfaces "Transfer," "Query," "Issue" are the protected level, the public level, and the privileged level, respectively. The interface fence 340B may also determine whether the account level of each account satisfies an interface condition. The interface condition may include the account level being higher than or equal to the interface level. For example, the account level of the account 424 is the protected level, which is higher than the interface level of the interface "Query," i.e., the public level. Therefore, the account level of the account 424 satisfies the interface condition.

In response to a determination that the account level of the account 424 satisfies the interface condition, the interface fence 340B may permit the request for accessing the interface "Query" of the smart contract 416. Similarly, the request of the account 426 for accessing the interface "Issue" of the smart contract 416 may be permitted, but the request of the account 422 for accessing the interface "Transfer" of the smart contract 416 may be denied, because the account level of the account 422, i.e., the public level, is lower than the interface level of the interface "Transfer," i.e., the protected level.

In the embodiment, a request for accessing an interface may be managed by both an account fence and an interface fence. When both the account fence and the interface fence permit the request, the account may access the interface.

Although the methods illustrated in FIGS. 4A-4D use a contract account as an example of the account to be accessed, it is appreciated that these methods may be similarly applied to a regular account.

Figure 5:
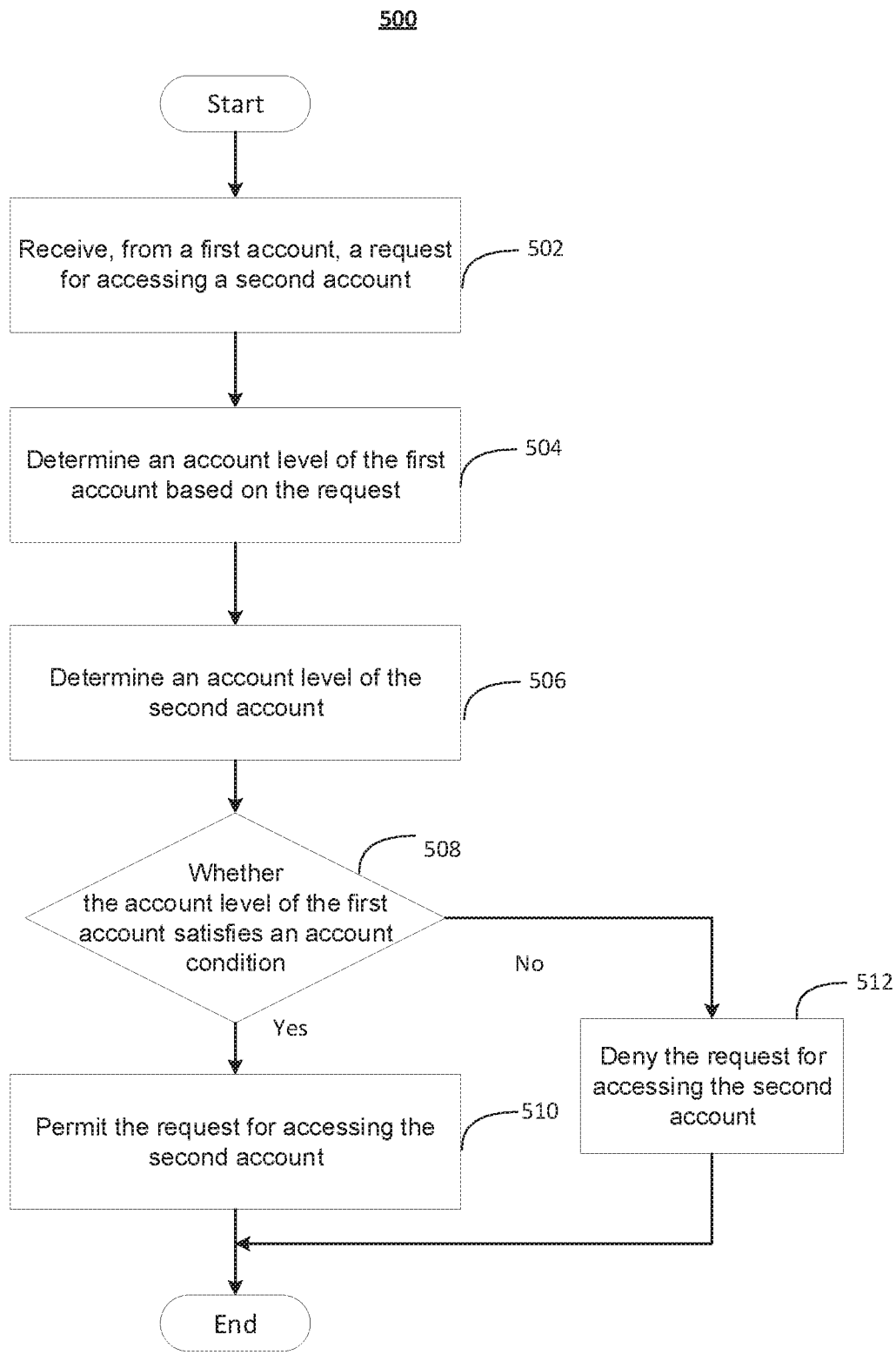
FIG. 5 is a flowchart of a method for managing access to an account in a blockchain system, according to an embodiment.

FIG. 5 is a flowchart of a method 500 for managing access to an account in a blockchain system, according to an embodiment. The method 500 may be performed by a computer system. The computer system may include a memory storing a set of instructions and at least one processor to execute the set of instructions to cause the computer system to perform the method 500. For example, the computer system may be the node 102 (FIG. 1), which may operate the virtual machine 300 (FIGS. 3 and 4A-4D). Referring to FIG. 5, the method 500 may include the following steps.

At step 502, the computer system may receive, from a first account of the blockchain system, a request for accessing a second account of the blockchain system.

At step 504, the computer system may determine an account level of the first account based on the request. For example, the computer system may determine an identity of the first account based on the request, and then determine the account level of the first account based on the determined identity. The account level may be one of a public level, a protected level, or a privileged level.

At step 506, the computer system may determine an account level of the second account. The account level of the second account may also be one of a public level, a protected level, or a privileged level, and may be the public level by default. When the second account is a contract account corresponding to a smart contract, the smart contract may also include an interface related to a function of the smart contract, and the computer system may further determine an interface level of the interface. The interface level may also be one of a public level, a protected level, or a privileged level, and may be the public level by default.

At step 508, the computer system may determine whether the account level of the first account satisfies an account condition based on the account level of the second account. The account condition includes the account level of the first account being higher than or equal to the account level of the second account.

In some embodiments, the request for accessing the second account may further include a request for accessing the interface of the smart contract. The computer system may further determine whether the account level of the first account satisfies an interface condition based on the interface level; and permit the request for accessing the interface of the smart contract in response to the determination that the account level satisfies the interface condition (not shown in FIG. 5). The interface condition may include the account level of the first account being higher than or equal to the interface level.

At step 510, the computer system may permit the request for accessing the second account, based on a determination that the account level of the first account satisfies the account condition.

At step 512, if the account level fails to satisfy the account condition, the computer system may deny the request for accessing the second account. Similarly, in response to a determination that the account level of the first account does not satisfy the interface condition, the computer system may deny the request for accessing the interface of the smart contract, even if the account condition is satisfied. For example, the smart contract may include a first interface having a first interface condition and a second interface having a second interface condition, the request further includes a first request for accessing the first interface and a second request for accessing the second interface, and the computer system may permit the first request for accessing the first interface in response to a determination that the account level of the account satisfies the account condition and the first interface condition, and deny the second request for accessing the second interface in response to a determination that the account level of the account does not satisfy the account condition or the second interface condition.

Figure 6:
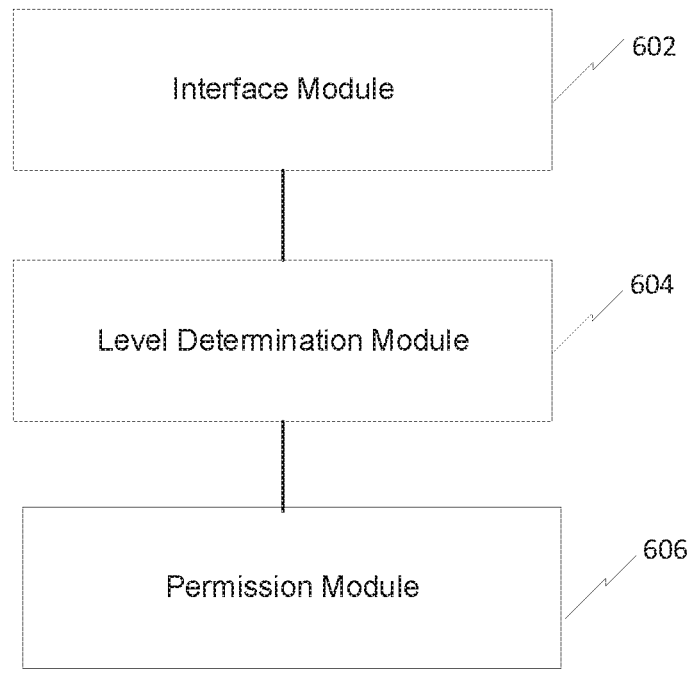
FIG. 6 is a block diagram of an apparatus for managing access to an account in a blockchain system, according to an embodiment.

FIG. 6 is a block diagram of an apparatus 600 for managing access to an account in a blockchain system, according to an embodiment. For example, the apparatus 600 may perform the method 500 (FIG. 5). Referring to FIG. 6, the apparatus 600 may include an interface module 602, a level determination module 604, and a permission module 606.

The interface module 602 may receive, from a first account of the blockchain system, a request for accessing a second account of the blockchain system.

The level determination module 604 may determine an account level of the first account based on the request, determine an account level of the second account, and determine whether the account level of the first account satisfies an account condition associated with the second account.

The permission module 606 may permit the request for accessing the second account in response to a determination that the account level of the first account satisfies the account condition, or deny the request for accessing the second account in response to a determination that the account level of the first account does not satisfy the account condition.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 600, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for managing access to an account in a blockchain system, comprising:
   receiving, by a node of the blockchain system, a request from a first account of the blockchain system to access a second account of the blockchain system, wherein the node implements a virtual machine that operates a permission fence and an interface, wherein the first and second
   accounts are assigned account levels, and wherein the second account is associated with an
   account condition for accessing the second account;
   providing, by the node of the blockchain system, the received request to the virtual machine:
   receiving, by the virtual machine, the provided request from the node of the blockchain system:
   providing, by the virtual machine, the received request to the permission fence:
   receiving, by the permission fence, the provided request from the virtual machine:
   determining, by the permission fence, an account level of the first account based on the received request;
   determining, by the permission fence, an account level of the second account;
   determining, by the permission fence, an interface level of the interface based on the received request:
   determining, by the permission fence, the account condition associated with the second account:
   determining, by the permission fence, whether the account level of the first account satisfies the account condition associated with the second account by determining whether the account level of the first account is higher than or equal to the account level of the second account and whether the account level of the first account is higher than or equal to the interface level of the interface; and
   based on a determination, by the permission fence that the account level of the first account satisfies the account condition associated with the second account, authorizing, by the permission fence, access from the first account to the second account by permitting the first account to call a function through the interface.

2. The method of claim 1, wherein the second account is one of a contract account corresponding to a smart contract or a regular account that does not correspond to a smart contract.

3. The method of claim 2, wherein the second account is the contract account corresponding to a smart contract, and the smart contract comprises the interface.

4. The method of claim 3, further comprising:
   based on a determination, by the permission fence, that the account level of the first account is not higher than or equal to the interface level of the interface, denying, by the permission fence, a request for accessing the interface of the smart contract.

5. The method of claim 4, wherein the smart contract comprises a first interface having a first interface level and a second interface having a second interface level, the request for accessing the interface of the smart contract further comprises a first request for accessing the first interface and a second request for accessing the second interface, and the method further comprises at least one of:
   based on a determination, by the permission fence, that the account level of the first account is higher than or equal to the account level of the second account and that the account
   level of the first account is higher than or equal to the first interface level, authorizing, by the permission fence, the first request access to the first interface of the smart contract; and
   based on a determination, by the permission fence, that the account level of the first account is not higher than or equal to the account level of the second account or that the account level of the first account is not higher than or equal to the second interface level, denying, by the permission fence, the second request for accessing the second interface of the smart contract.

6. The method of claim 2, wherein the account level of the first account comprises a public level, a protected level, or a privileged level; and the account level of the second account comprises the public level, the protected level, or the privileged level.

7. The method of claim 3, wherein the account level of the first account comprises a public level, a protected level, or a privileged level; the account level of the second account comprises the public level, the protected level, or the privileged level; and the interface level comprises the public level, the protected level, or the privileged level.

8. The method of claim 7, wherein the account level of the contract account is the public level by default; and the interface level is the public level by default.

9. The method of claim 1, wherein in determining the account level of the first account based on the received request, the method further comprises: determining, by the permission fence, an identity of the first account based on the request; and determining, by the permission fence, the account level of the first account based on the determined identity.

10. A device for managing access to an account in a blockchain system, the device operating as a node of the blockchain system and comprising: one or more processors; and one or more computer-readable memories coupled to the one or more processors and having instructions stored thereon that are executable by the one or more processors, wherein the one or more processors are configured to:

receive, by the node of the blockchain system, a request from a first account of the blockchain system to access a second account of the blockchain system, wherein the node implements a virtual machine that operates a permission fence and an interface, wherein the first and second accounts are assigned account levels, and wherein the second account is associated with an account condition for accessing the second account;

provide, by the node of the blockchain system, the received request to the virtual machine:

receive, by the virtual machine, the provided request from the node of the blockchain system:

provide, by the virtual machine, the received request to the permission fence:

receive, by the permission fence, the provided request from the virtual machine:

determine, by the permission fence, an account level of the first account based on the received request;

determine, by the permission fence, an account level of the second account; determine, by the permission fence, an interface level of the interface based on the received request:

determine, by the permission fence, the account condition associated with the second account:

determine, by the permission fence, whether the account level of the first account satisfies the account condition associated with the second account by determining whether the account level of the first account is higher than or equal to the account level of the second account and whether the account level of the first account is higher than or equal to the interface level of the interface; and based on a determination, by the permission fence, that the account level of the first account satisfies the account condition associated with the second account is, authorize, by the permission fence, access from the first account to the second account by permitting the first account to call a function through the interface.

11. A non-transitory computer-readable medium having stored therein instructions that, when executed by a processor of a device, cause the device to perform a method for managing access to an account in a blockchain system, the device operating as a node of the blockchain system. the method comprising:

receiving, by the node of the blockchain system, a request from a first account of the blockchain system to access a second account of the blockchain system, wherein the node implements a virtual machine that operates a permission fence and an interface, wherein the first and second accounts are assigned account levels, and wherein the second account is associated with an account condition for accessing the second account;

providing, by the node of the blockchain system, the received request to the virtual machine:

receiving, by the virtual machine, the provided request from the node of the blockchain system:

providing, by the virtual machine, the received request to the permission fence:

receiving, by the permission fence, the provided request from the virtual machine:

determining, by the permission fence, an account level of the first account based on the received request;

determining, by the permission fence, an account level of the second account;

determining, by the permission fence, an interface level of the interface based on the received request:

determining, by the permission fence, the account condition associated with the second account:

determining, by the permission fence, whether the account level of the first account satisfies the account condition associated with the second account by determining whether the account level of the first account is higher than or equal to the account level of the second account and whether the account level of the first account is higher than or equal to the interface level of the interface; and based on a determination, by the permission fence, that the account level of the first account satisfies the account condition associated with the second account is, authorizing, by the permission fence, access from the first account to the second account by permitting the first account to call a function through the interface.

12. The device of claim 10, wherein the second account is one of a contract account corresponding to a smart contract or a regular account that does not correspond to a smart contract.

13. The device of claim 12, wherein the second account is the contract account corresponding to a smart contract, and the smart contract comprises the interface.

* * * * *

UNITED STATES PATENT AND TRADEMARK OFFICE
CERTIFICATE OF CORRECTION

PATENT NO. : 11,157,897 B2
APPLICATION NO. : 16/773235
DATED : October 26, 2021
INVENTOR(S) : Zhongxiao Yao It is certified that error appears in the above-identified patent and that said Letters Patent is hereby corrected as shown below:

In the Claims

Claim 1, Column 13, Line 58, remove paragraph break after "second".

Claim 1, Column 13, Line 60, remove paragraph break after "an".

Claim 1, Column 13, Line 63, "machine:" should read as --machine;--.

Claim 1, Column 13, Line 65, "system:" should read as --system;--.

Claim 1, Column 13, Line 67, "fence:" should read as --fence;--.

Claim 1, Column 14, Line 2, "machine:" should read as --machine;--.

Claim 1, Column 14, Line 8, "request:" should read as --request;--.

Claim 1, Column 14, Line 10, "account:" should read as --account;--.

Claim 5, Column 14, Line 48, remove paragraph break after "account".

Claim 10, Column 15, Line 27, remove paragraph break after "first".

Claim 10, Column 15, Line 29, remove paragraph break after "associated".

Claim 10, Column 15, Line 33, "machine:" should read as --machine;--.

Claim 10, Column 15, Line 35, "system:" should read as --system;--.

Claim 10, Column 15, Line 37, "fence:" should read as --fence;--.

Signed and Sealed this
Seventh Day of November, 2023

Katherine Kelly Vidal
*Director of the United States Patent and Trademark Office*

CERTIFICATE OF CORRECTION (continued)
U.S. Pat. No. 11,157,897 B2

Claim 10, Column 15, Line 39, "machine:" should read as --machine;--.

Claim 10, Column 15, Line 45, "request:" should read as --request;--.

Claim 10, Column 15, Line 47, "account:" should read as --account;--.

Claim 10, Column 15, Lines 58-59, "account is," should read as --account,-- then remove paragraph break after --account,--.

Claim 11, Column 16, Line 14, remove paragraph break after "first".

Claim 11, Column 16, Line 16, remove paragraph break after "associated".

Claim 11, Column 16, Line 20, "machine:" should read as --machine;--.

Claim 11, Column 16, Line 22, "system:" should read as --system;--.

Claim 11, Column 16, Line 24, "fence:" should read as --fence;--.

Claim 11, Column 16, Line 26, "machine:" should read as --machine;--.

Claim 11, Column 16, Line 32, "request:" should read as --request;--.

Claim 11, Column 16, Line 34, "account:" should read as --account;--.

Claim 11, Column 16, Lines 45-46, "account is," should read as --account,-- then remove paragraph break after --account,--.

Claim 11, Column 16, Line 47, remove paragraph break after "fence,".